United States Patent
Verma

(10) Patent No.: US 11,797,631 B2
(45) Date of Patent: Oct. 24, 2023

(54) SYSTEM AND METHOD PROVIDING DATA MANAGEMENT AND SHARING OVER COMMUNICATION NETWORK

(71) Applicant: HCL AMERICA INC., Sunnyvale, CA (US)

(72) Inventor: Prafull Verma, Sunnyvale, CA (US)

(73) Assignee: HCL AMERICA INC., Sunnyvale, CA (US)

( * ) Notice: Subject to any disclaimer, the term of this patent is extended or adjusted under 35 U.S.C. 154(b) by 51 days.

(21) Appl. No.: 17/001,478

(22) Filed: Aug. 24, 2020

(65) Prior Publication Data

US 2022/0058233 A1 Feb. 24, 2022

(51) Int. Cl.
G06F 16/9538 (2019.01)
G06F 16/9536 (2019.01)
H04L 65/40 (2022.01)
G06F 3/048 (2013.01)

(52) U.S. Cl.
CPC ...... *G06F 16/9538* (2019.01); *G06F 16/9536* (2019.01); *G06F 3/048* (2013.01); *H04L 65/40* (2013.01)

(58) Field of Classification Search
None
See application file for complete search history.

(56) References Cited

U.S. PATENT DOCUMENTS

| | | | |
|---|---|---|---|
| 6,901,394 B2 | 5/2005 | Chauhan et al. | |
| 2006/0036563 A1 | 2/2006 | Wu | |
| 2011/0225293 A1 | 9/2011 | Rathod | |
| 2016/0041986 A1* | 2/2016 | Nguyen | G06Q 50/01 707/711 |
| 2016/0179807 A1* | 6/2016 | Kumar | G06F 16/24534 707/706 |
| 2017/0263068 A1* | 9/2017 | Yang | G07C 13/00 |
| 2020/0233872 A1* | 7/2020 | Vergo | G06F 16/24578 |

OTHER PUBLICATIONS

Crowdsourcing for Enterprises—IBM T.J. Watson Research (2009).

* cited by examiner

*Primary Examiner* — Thu N Nguyen

(57) ABSTRACT

The present disclosure relates to a system and method for providing data management and sharing over communication network. One or more input data form one or more users may be received over a User Interface (UI). One or more data input type is identified. According to each data input type, each data input is processed. The processing comprises according to the type of the data input, output towards each of the data input is search though a search engine. The searching is performed in one or more database. Based on the searching one or more response output towards each of the data input is generated. Further, one or more response output over the communication is published.

8 Claims, 4 Drawing Sheets ated with knowledge
SYSTEM AND METHOD PROVIDING DATA MANAGEMENT AND SHARING OVER COMMUNICATION NETWORK

CROSS-REFERENCE TO RELATED APPLICATION AND PRIORITY

The present application does not claim priority from any patent application.

TECHNICAL FIELD

The present disclosure in general relates to a field of data management and data sharing. More particularly, the present disclosure relates to a system and method for providing content management and data sharing over a communication network.

BACKGROUND

Typical knowledge management systems include process to source each of knowledge sharing of data, verification of data, authorization of data and publication of data. Enterprises invest heavily in capturing, processing, maintaining and distributing knowledge assets relevant to knowledge management systems. In order to support the process, the enterprises employ people with multiple roles like Knowledge Contributors, Subject Matter Experts (SMEs), Knowledge Writers, Knowledge Managers, Knowledge base owners and Chief Knowledge Officer. Further, the knowledge contribution is not authoritative in contributions of each of the above listed roles.

Hence such contributions often go through a long process of verification, validation, approval by SMEs, documentation, etc. before getting published. Knowledge is restricted as information is shared and published by specific and limited resources. The knowledge being shared may only provide a high-level perspective about a scenario and may not directly answer concerns of end user due to incongruence and incompleteness of information. In most cases such kind of information sharing is waste of money because investments are not made in maintaining the knowledge current and thus such type of knowledge bases become irrelevant quickly.

Further, normal tendency of user is to use public platform and look for solution over internet rather than leveraging enterprise knowledge management system. The public platform returns multiple options of the solution and the user fixes the problem themselves by trial and error. In such cases, unlimited crowd becomes the knowledge provider and users may get direct solutions to their problems, however, the authenticity and accuracy of the information is not guaranteed.

SUMMARY

Before the present system and method providing data management and sharing over communication, is described, it is to be understood that this application is not limited to the particular system, and methodologies described, as there can be multiple possible embodiments which are not expressly illustrated in the present disclosure. It is also to be understood that the terminology used in the description is for the purpose of describing the particular version or embodiments only and is not intended to limit the scope of the present application. This summary is provided to introduce concepts related to system and method providing data management and sharing over communication network. This summary is not intended to identify essential features of the claimed subject matter nor is it intended for use in determining or limiting the scope of the claimed subject matter.

In one implementation, a system providing data management and sharing over communication network is illustrated. The system comprises a processor and a memory coupled to the processor. The memory is configured to store a set of instructions to be executed by the processor and the processor is configured to identify a type of data input from one or more data input, process, each data input according to the type of data input. The data processing comprises, search, through a search engine, one or more response output toward each of the data input according to the type of the data input. The searching is performed in one or more knowledge repository. The processing further comprises generating one or more response output towards each of the data input based on the searching. The data processing further comprises publishing, one or more response output over the communication network, the one or more response output response are published in real-time.

In another implementation, a method for management and data sharing over a communication is illustrated. The method comprises receiving, over a User Interface (UI), one or more data inputs from one or more users and identifying a type of data input from the one or more data inputs. The processing further comprises searching, through each data input according to the type of data input. The searching is performed in one or more database. The processing further comprises generating one or more response output towards each of the data input based on the searching and publishing, the one or more response output over the communication network. The one or more response output is published in real-time.

BRIEF DESCRIPTION OF DRAWINGS

The detailed description is described with reference to the accompanying figures. In the figure, the left-most digit (s) of a reference number identifies the figure in which the reference number first appears. The same number are used throughout the drawings to refer like features and components.

DETAILED DESCRIPTION

Figure 1:
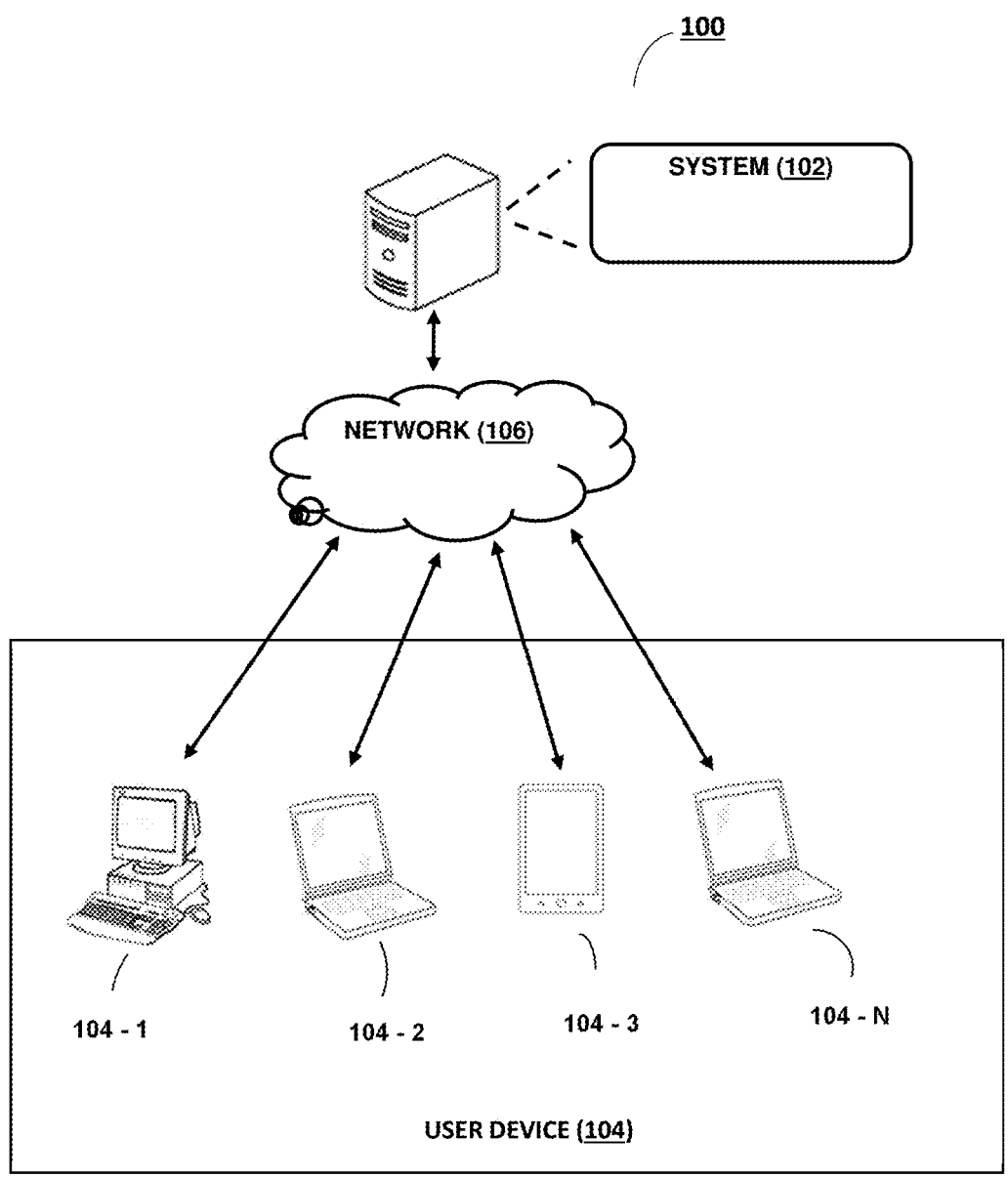
FIG. 1 illustrates a network implementation of a system 102 providing content management and data sharing over a communication network, in accordance with an embodiment of the present subject matter.

Some embodiments of the present disclosure, illustrating all its features, will now be discussed in detail. The words "including", "comprising", "consisting", "containing", and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any system and methods similar or equivalent to those described herein can be used in the practice or testing of embodiments of the present disclosure, the exemplary, system and methods providing content management and data sharing over a communication network are now described. The disclosed embodiments of the system and method providing content management and data sharing over a communication network are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure of providing content management and data sharing over a communication network is not intended to be limited to the embodiment illustrated, but is to be accorded the widest scope consistent with principles and features described herein.

Generally, system configured for obtaining knowledge includes acquiring knowledge from a source, verifying content, authorizing the content and finally publishing the content. Process implemented to obtain the knowledge data base is lengthy and expensive. Thus, procured knowledge may become irrelevant quickly. The content may include any information about any service, product, hardware information, software information, and any other information relevant to an organization.

The present subject matter overcomes the problem of content management and data sharing over a communication network in an enterprise. One or more data input is received from a user and a data received is identified and processed according to a type of data input. According to the type of the data input, search engine is configured to search and generate one or more response output towards each of the data input. The user here refers to resources within the organization.

The content management refers to chronological arrangement of each of the user's input data and response output in the database so that such content management helps in an easy and quick retrieval of data. Data sharing refers to sharing of knowledge in terms of the data input and the response output over a portal configured in the organization. Proposed system is integrated to the portal and helps in providing the content management and the data sharing amongst the user associated within the organization.

Referring now to FIG. 1, a network implementation 100 of a system 102 providing content management and data sharing over communication network is disclosed. Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented over a cloud network. Further, it will be understood that the system 102 may be accessed by multiple users through one or more user devices 104-1, 104-2 . . . 104-N, collectively referred to as user device 104 hereinafter, or applications residing on the user device 104. Examples of the user device 104 may include, but are not limited to, a portable computer, a personal digital assistant, a handheld device, and a workstation. The user device 104 may be communicatively coupled to the system 102 through a network 106.

In one implementation, the network 106 may be a wireless network, a wired network or a combination thereof. The network 106 may be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), and the like, to communicate with one another. Further, the network 106 may include a variety of network devices, including routers, bridges, servers, computing devices, storage devices and the like.

In one embodiment, the system 102 may receive one or more request associated with one or more devices connected to a communication network 106. The one or more request may also be referred as one or more data inputs.

Figure 2:
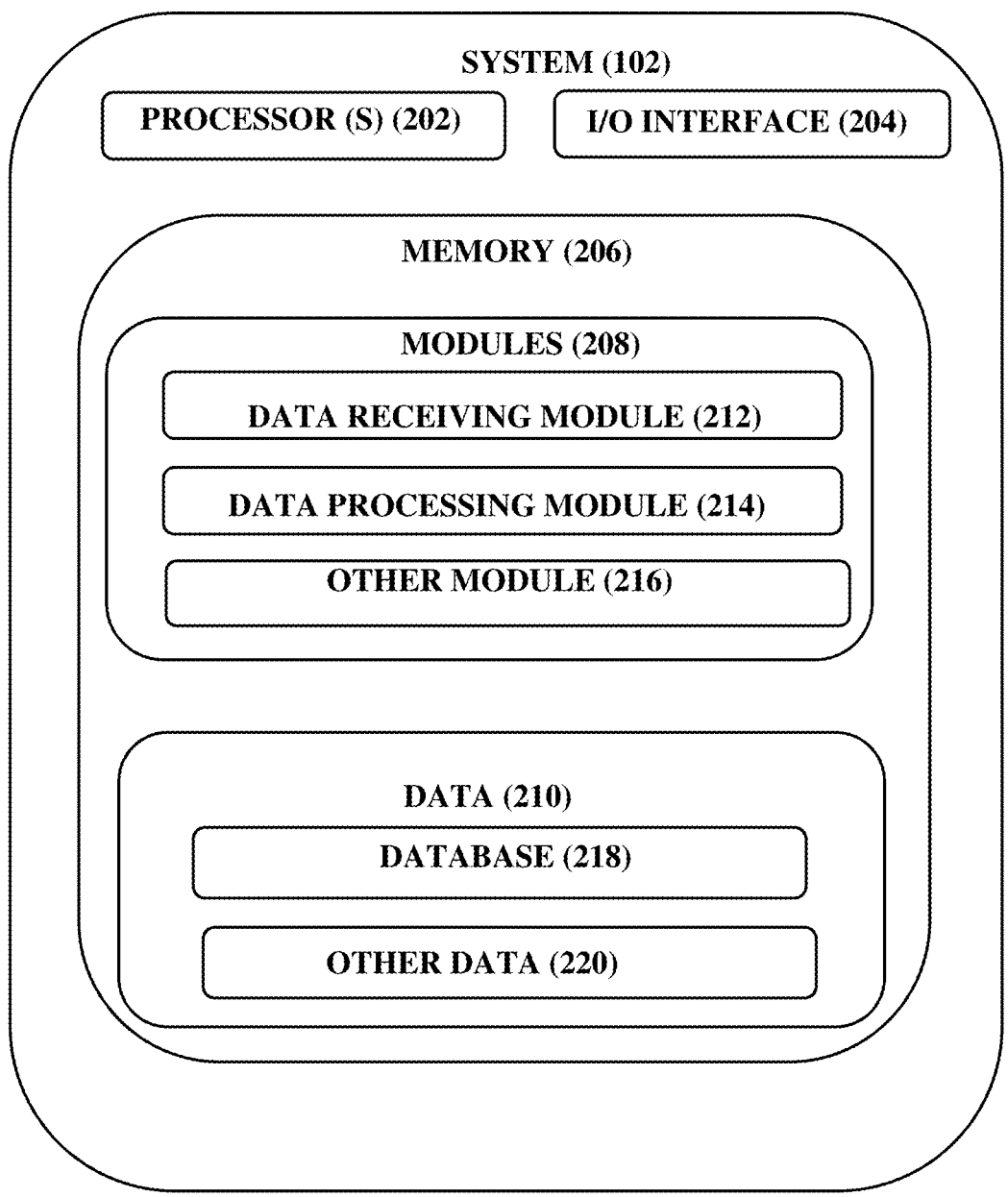
FIG. 2 illustrates an architecture of the system 102 providing content management and data sharing over a communication network, in accordance with an embodiment of the present subject matter.

Referring to FIG. 2, the system 102 providing content management and data sharing over a communication network is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machine logic circuitries, and/or any device that manipulate signals based on operational instructions. Among other capabilities, at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user device 104. Further, the I/O interface 204 may enable the system 102 to communication with other computing devices, such as web servers and external data servers (not shown). The I/O interface 204 may facilitate multiple communication within a wide variety of networks and protocol types, including wired networks, for example, LAN, cable, etc, and wireless networks, such as WLAN, cellular, or satellite. The I/O interface 204 may include one or more ports for connecting a number of devices to one another or to another server.

In one implementation, a user may access the system 102 via the I/O interface. The user may be registered using the I/O interface in order to use the system 102. In one aspect, the user may access the I/O interface of the system 102 for obtaining information, providing input information or configuring the system 102.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include data.

The memory 206 is connected to a plurality of modules 208. The system 102 comprises a User Interface as data receiving module 212, data processing module 214 and other module 216. The other modules 216 may include programs or coded instructions that supplement applications and functions of the system 102.

The data 210, amongst other things, serve as a database for storing data process, received, and generated by one or more of the modules 208. The 210 may also include a database 218, and other data 220. In one embodiment, the other data 220 may include data generated as a result of the execution of one or more modules in the other modules 216.

In one embodiment, data receiving module 212 may be configured to receive data input from a user. The data input may be received in form of a query related to one of a service facilitated by an organization or a product developed by the organization for example, laptop provisioning request or a software installation request etc. The user may use the UI or I/O Interface 204 for posting the query. The UI refers to a customizable UI and the UI may be customized with regard to display requirement of each of the data input and the response output. The data input further needs to be processed for generating a response output to a query posted by one or more users or for generating additional response output to a previously published response output.

In an example, the query may be related to an international travel policy. Consider a situation where the user wants to book an international travel ticket but may have queries related to the international travel policies. The user may further post the query related to international travel polices before requesting for travel ticket through company portal. Further, anyone in the community who receives the query may respond to the query posted by the user and their response will be posted without having to go through an approval process.

In another example embodiment the user may have requested for a server from the IT provisioning platform in the organization. Further, the user may want to know about management of e-subscription, like pausing the subscription for a pre-fixed time period, stopping the subscription, reactivating the subscription, then the user may post his query, and anyone from the community of the enterprise users may provide the response towards the query.

In one embodiment, the data processing module 214 may be configured to search though a search engine, the one or more response output towards each of the data input. The data processing module 214 may further be configured to generate and publish one or more response output towards each of the data input based on the searching. One or more published response may be displayed to the user over the user interface 204.

The searching may include identifying a previously posted response output for a previously posted data input. The data input may be additional knowledge about previously posted response output. The searching may further comprise integrating the data input to the previously posted response output to form a thread of output response. The thread of the response output is searched and posted for a next data input similar to one of the previously posted data input.

In an example embodiment, a user posts a query A as the data input for which one or more response B may be suggested by another user. In case a new user adds a delta to the query A and posts the query A with delta, then the data processing module will also show the response B along with the additional response towards the delta added to the query A. The additional response may also get integrated to the response B forming the thread of the response. Each response in the thread of the response may be arranged in a chronological order. The one or more responses may be suggested and displayed in a chronological order. The thread further provides the details of the one or more user sharing the response and details of the user posting the response. The details of the one or more user may include name of the user and email id of the user.

In one embodiment, the system 102 also comprises the database 218 configured to store the list of queries received as the data input, the response output to the query posted by one or more user, the additional response output to a previously published response output.

Figure 3:
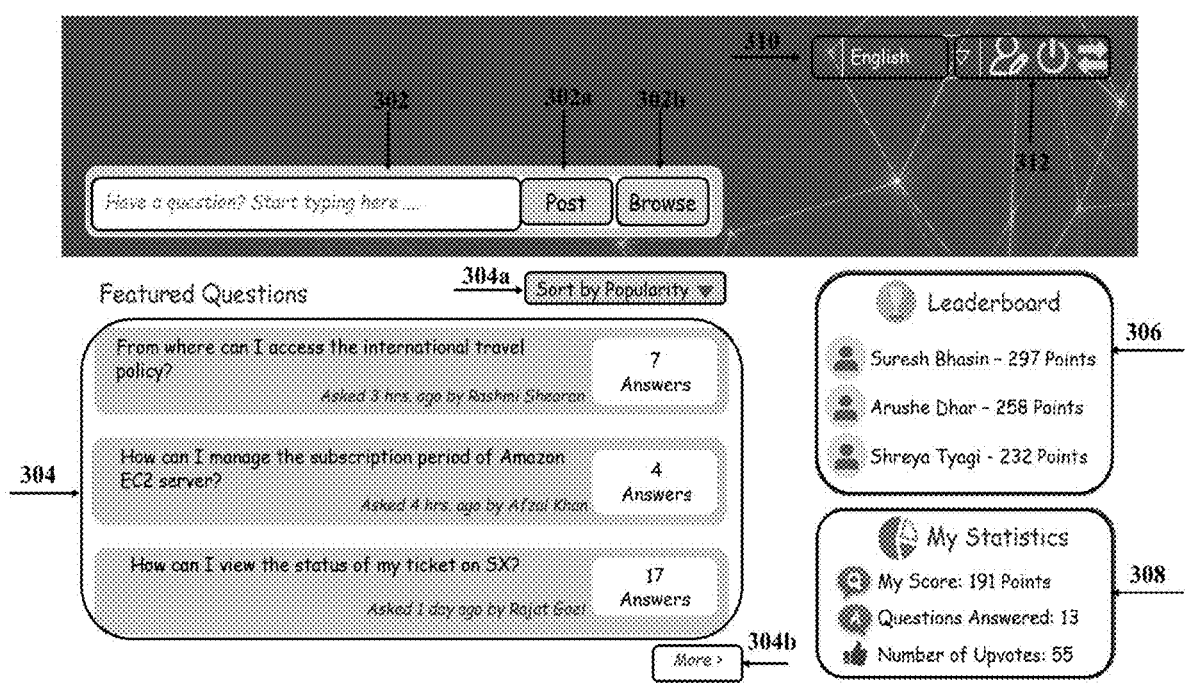
FIG. 3 illustrates a content management and data sharing platform associated with the system 102, in accordance with an embodiment of the present subject matter.

FIG. 3 illustrates a screenshot of the user interface 204 of system 102 configured to provide data management and sharing over the communication network in accordance with an embodiment of the present subject matter. The user interface 204 may be used by the user for searching for the query related (data input) to the service provided by the enterprise. The user interface 204 comprising of one or more sections and the one or more sections may be customized for customizing the user interface 204. The one or more sections comprises at least one of an input tab 302, a post tab 302*a*, a browse tab 302*b*, featured question 304, leader board tab 306, my statistic tab 308 and a language tab 310.

In an example embodiment, the user A may type the query through the input tab 302 and post the query using the post tab 302*a* coupled to the processor 202 at the backend. Further, when another user B receives the query of user A, the query as visible in the feature question tab 304 may be processed further. Further, user B may choose to respond to any query in 304 by clicking on the question. When the user clicks on a query, the user may be redirected to a new page that may contain all the previous responses for the query. User B may also view all the previously posted queries by clicking the more button 304*b* positioned at the bottom of the user interface.

Alternatively, before posting a new query, the user may search for similar queries by using one or more key words through the search bar 302 and browse through the browse 302*b* the list of queries similar to the query posted by the user. Clicking browse button opens a new page and the response to previously posted similar queries may also be found on the same page.

Further, user B may also add additional inputs to the previously shared query response using the featured question tab 304 operated by the processor 202. Further, using sort tab 304*a*, the user may sort the queries based on popularity of data posted through User Interface 204. Further, the user may view the ratings provided to the users who responded to the query through a leader board tab 306 operated by the processor. The user may also view rating towards his response Through My Statistics 308. The user A and B further may set the language though the language tab 310 operated by the processor 202. Thus, the user interface 204 of the system 102 may enable the user to view, browse and post queries in different languages.

In an embodiment the user interface 204 can be accessed by any user in an organization to post a question and similarly, any user in the organization who sees the query can respond to the query.

The user interface 204 further provides an option for sorting the query and the response output according to one or more options for example, sort by popularity 304*a*. The user interface 204 may be customized to support one or more features for better query search and data sharing. The one or more features comprise questions, or leader board. The screenshot shown in FIG. 3 is an exemplary embodiment for which intent is not to limit the scope of the description. This is further to be understood that variations in the user interface is within the scope of the description.

In another exemplary embodiment, each of the response output is associated with a rating (points). The rating may be given to the user based on one or more parameters. The one or more parameters may comprise one of a relevancy of the response output, number of responses present in the response output, number of occurrences of the response output during the search. In an example the user B may provide solution to the query posted by another user. The solution provided may receive upvote from other users. The points assigned to the user may be assigned for each task executed. The points assigned may correspond to points for each of a new query posted by a user (0 points), points for answering the query raised by other users (2 points) and further, for each upvote on the response, the user receives 3 points. Total points gained by the users on any day may be calculated to determine top three-point achievers and the top three point achievers may then be published on the leader board 306. The upvotes received for any response are visible to all users on the I/O interface 204.

Figure 4:
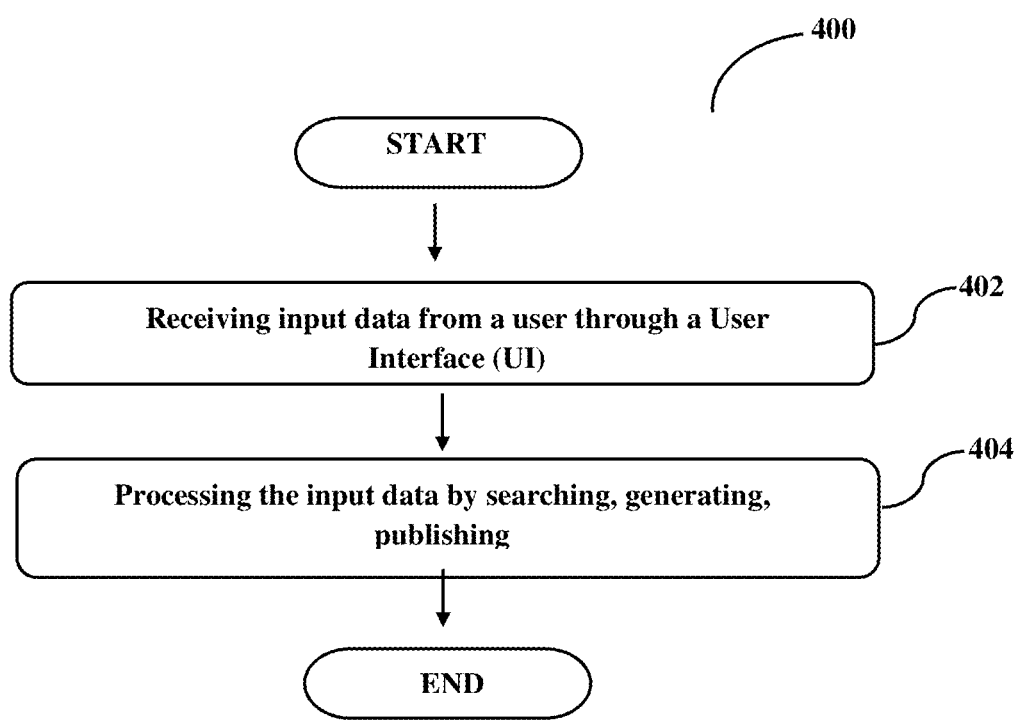
FIG. 4 illustrates method for providing content management and data sharing over a communication network, in accordance with an embodiment of the present subject matter.

Referring now to FIG. 4, a method 400 providing content management and data sharing over the communication network, is disclosed in accordance with an embodiment of the present subject matter. The method 400 may be described in the general context of computer executable instructions. Generally, computer executable instructions can include routines, programs, objects, components, data structure, procedures, modules, functions, and the like, that perform particular functions or implement particular abstract data types. The method 400 may also be practiced in a distributed computing environment where functions are performed by remote processing devices that are linked through a communications network. In a distributed computing environment, computer executable instruction may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method 400 can be implemented in any suitable hardware, software, firmware, or combination thereof. However, for ease of explanation, in the embodiments described below, the method 400 may be considered to be implemented in the above described system 102.

At block 402, the one or more data input from one or more user over the User Interface (UI) 204 are received. The input data comprise at least one of the query posted by the user, the response output to the query and additional response to the previously published response output.

At block 404, each input data is processed. The query is processed for searching, the one or more response output towards each of the data input. Further, the processing includes generating one or more response output towards each of the data input base on the search and publishing one or more response output over the communication network. The response may be published in a real-time.

In one embodiment, the method 400 may be configured to enable the user to vote for one or more response output. Further, based on voting the method 400 is configured to calculate and provide the rating for the one or more response output.

Exemplary embodiments discussed above may provide certain advantages. Though not required to practice aspects of the disclosure, the advantages may include those provided by the following features.

Some embodiments of the system and the method may be configured for content management and data sharing over a communication network in an enterprise. The method and system disclosed helps an end-user to search through information and self-resolve issues.

Some embodiment of the system and the method may provide response to the query by a user without verification, validation, approval by subject matter expert, documentation before a knowledge is published.

Some embodiment of the system and the method may allow any user to respond to the query.

The invention claimed is:

1. A method providing content management and data sharing over a communication network, the method comprising:
   receiving, over a User Interface (UI), one or more data inputs from one or more users;
   identifying a type of data input from the one or more data inputs;
   processing, each data input according to the type of data input, wherein the processing comprises:
   searching, through a search engine, one or more response output towards each of the data input according to the type of the data input, wherein the searching is performed in one or more database;
   generating one or more response output towards each of the data input based on the searching; and
   publishing, the one or more response output over the communication network, wherein the one or more response output are published in real-time;
   enabling at least one user from the one or more users to vote towards the one or more response output published;
   calculating a rating of at least one knowledge provider user from the one or more users for the one or more response output based on the voting, wherein a top achiever from the one or more users is determined, based on the rating; and
   rendering, via an I/O (Input/Output) interface, the rating provided to the at least one knowledge provider user for the one or more response output and the top achiever from the one or more users, thereby providing authenticity and accuracy for the one or more response output.

2. The method as claimed in claim 1, wherein the type of each of the data input comprise at least one of a query posted by a user, a response output to a query posted by one or more users, additional response output to a previously published response output.

3. The method as claimed in claim 1, wherein the database comprises a list queries received as the data input, a response output to a query posted by one or more users, additional response output to a previously published response output.

4. The method as claimed in claim 1, wherein the searching comprises:
   identifying, a previously posted response output for a previously posted data input, wherein the data input is additional knowledge about the previously posted response output; and
   integrating the data input to the previously posted response output to form a thread of output response, wherein the thread of the response output is searched and posted for a next data input similar to one of the previously posted data input.

5. A system providing content management and data sharing over a communication network, the system comprising:
- a User Interface (UI), configured to receive, one or more data inputs from one or more users;
- a processor;
- a memory coupled to the processor, wherein the memory is configured to store a set of instructions to be executed by the processor, wherein the processor is configured to:
    - identify a type of data input from the one or more data inputs;
    - process, each data input according to the type of data input, wherein the processing comprises:
    - search, through a search engine, one or more response output towards each of the data input according to the type of the data input, wherein the searching is performed in one or more database;
    - generate one or more response output towards each of the data input based on the searching; and
    - publish, the one or more response output over the communication network, wherein the one or more response output are published in real-time;
    - enable at least one user from the one or more users to vote towards the one or more response output published;
    - calculate a rating of at least one knowledge provider user from the one or more users for the one or more response output based on the voting, wherein a top achiever from the one or more users is determined, based on the rating; and
    - render, via an I/O (Input/Output) interface, the rating provided to the at least one knowledge provider user for the one or more response output and the top achiever from the one or more users, thereby providing authenticity and accuracy for the one or more response output.

6. The system as claimed in claim 5, wherein the type of each of the data input comprise at least one of a query posted by a user, a response output to a query posted by one or more users, additional response output to a previously published response output.

7. The system as claimed in claim 5, wherein the database comprises a list queries received as the data input, a response output to a query posted by one or more users, additional response output to a previously published response output.

8. The system as claimed in claim 5, wherein the processor is configured to:
- identify, a previously posted response output for a previously posted data input, wherein the data input is additional knowledge about the previously posted response output; and
- integrate the data input to the previously posted response output to form a thread of output response, wherein the thread of the response output is searched and posted for a next data input similar to one of the previously posted data input.

* * * * *